United States Patent
Ha

(10) Patent No.: US 12,293,558 B2
(45) Date of Patent: May 6, 2025

(54) METER RECOGNITION APPARATUS, METER MONITORING SYSTEM, AND MONITORING METHOD THEREFOR

(71) Applicant: BOE TECHNOLOGY GROUP CO., LTD., Beijing (CN)

(72) Inventor: Qian Ha, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 387 days.

(21) Appl. No.: 17/790,362

(22) PCT Filed: Jul. 5, 2021

(86) PCT No.: PCT/CN2021/104523
§ 371 (c)(1),
(2) Date: Jun. 30, 2022

(87) PCT Pub. No.: WO2022/042045
PCT Pub. Date: Mar. 3, 2022

(65) Prior Publication Data
US 2023/0045188 A1 Feb. 9, 2023

(30) Foreign Application Priority Data

Aug. 28, 2020 (CN) .......................... 202010890099.2

(51) Int. Cl.
*G06V 10/25* (2022.01)
*G08C 17/02* (2006.01)

(52) U.S. Cl.
CPC ............. *G06V 10/25* (2022.01); *G08C 17/02* (2013.01)

(58) Field of Classification Search
CPC .... G06V 10/141; G06V 10/147; G06V 10/25; G06V 10/82; G06V 20/60;
(Continued)

(56) References Cited

U.S. PATENT DOCUMENTS

2001/0002850 A1* 6/2001 Slatter ................ H04N 1/40056
348/241
2002/0113882 A1* 8/2002 Pollard ................ H04N 1/2112
348/370
(Continued)

FOREIGN PATENT DOCUMENTS

CN 1789923 A 6/2006
CN 201955891 U 8/2011
(Continued)

OTHER PUBLICATIONS

R. Ocampo-Vega, G. Sanchez-Ante, L. E. Falcón-Morales and H. Sossa, "Image Processing for Automatic Reading of Electro-Mechanical Utility Meters," 2013 12th Mexican International Conference on Artificial Intelligence, México, Mexico, 2013, pp. 164-170 (Year: 2013).*

(Continued)

*Primary Examiner* — Chineyere Wills-Burns
*Assistant Examiner* — Emmanuel Silva-Avina
(74) *Attorney, Agent, or Firm* — XSENSUS LLP

(57) ABSTRACT

A meter monitoring system (200) includes: a wireless gateway (202), a monitoring device (201), and at least one meter recognition apparatus (100). The meter recognition apparatus (100) includes: an image acquirer (1), a processor (2), and a wireless transceiver (3). The image acquirer (1) is configured to acquire images of a display side of a monitoring meter (4) at set time intervals. The processor (2) is coupled to the image acquirer (1) and configured to determine, according to an image of the images acquired by the image acquirer (1) and based on an image processing algorithm, monitoring data displayed by the monitoring meter (4). The wireless transceiver (3) is coupled to the processor (2) and configured to send the monitoring data determined by the processor (2) to the wireless gateway (Continued)

(202). The wireless gateway (202) is configured to transmit the received monitoring data to the monitoring device (201).

18 Claims, 7 Drawing Sheets

(58) Field of Classification Search
CPC .... G06V 2201/02; G08C 17/02; H04N 7/181; H04N 7/18; H04N 23/66; H04N 23/60; H04N 23/617
USPC .......................................................... 382/103
See application file for complete search history.

(56) References Cited

U.S. PATENT DOCUMENTS

| | | | | |
|---|---|---|---|---|
| 2015/0049218 A1* | 2/2015 | Fu | ........................... | H04N 23/80 |
| | | | | 348/239 |
| 2018/0287657 A1* | 10/2018 | Rose | ........................ | H04B 1/40 |
| 2020/0007824 A1* | 1/2020 | Henry | ..................... | H04N 23/23 |

FOREIGN PATENT DOCUMENTS

| | | | | | |
|---|---|---|---|---|---|
| CN | 103605959 | A | | 2/2014 | |
| CN | 103714329 | A | | 4/2014 | |
| CN | 104376545 | A | | 2/2015 | |
| CN | 104678963 | A | | 6/2015 | |
| CN | 104913797 | A | | 9/2015 | |
| CN | 106526345 | A | | 3/2017 | |
| CN | 206110872 | U | | 4/2017 | |
| CN | 107135372 | A | | 9/2017 | |
| CN | 109147297 | A | * | 1/2019 | |
| CN | 208520404 | U | | 2/2019 | |
| CN | 109495574 | A | * | 3/2019 | |
| CN | 110059622 | A | | 7/2019 | |
| CN | 110111387 | A | | 8/2019 | |
| CN | 110929723 | A | | 3/2020 | |
| CN | 111368823 | A | | 7/2020 | |
| CN | 111428659 | A | | 7/2020 | |
| CN | 112258379 | A | | 1/2021 | |
| CN | 112347877 | A | | 2/2021 | |
| JP | 2003-272076 | A | | 9/2003 | |
| JP | 2011-196713 | A | | 10/2011 | |
| JP | 2012-38195 | A | | 2/2012 | |
| KR | 10-1985712 | B1 | | 6/2019 | |
| TW | 201349129 | A | | 12/2013 | |
| WO | WO-2013136295 | A1 | * | 9/2013 | ............. G01D 4/008 |

OTHER PUBLICATIONS

International search Report issued for International Application No. PCT/CN2021/083331 on Jun. 28, 2021.
First Office Action Issued by the Chinese Patent Office for Application No. 202010890099.2 on Aug. 17, 2022.

* cited by examiner

METER RECOGNITION APPARATUS, METER MONITORING SYSTEM, AND MONITORING METHOD THEREFOR

CROSS-REFERENCE TO RELATED APPLICATIONS

This application is a national phase entry under 35 USC 371 of International Patent Application No. PCT/CN2021/104523, filed on Jul. 5, 2021, which claims priority to Chinese Patent Application No. 202010890099.2, filed on Aug. 28, 2020, which are incorporated herein by reference in their entirety.

TECHNICAL FIELD

The present disclosure relates to the field of meter monitoring, and in particular, to a meter recognition apparatus, a meter monitoring system and a monitoring method therefor.

BACKGROUND

Monitoring meters may be used to sense parameters such as temperature, pressure, voltage, current, and the like. In a variety of application scenarios (e.g., power transmission, petroleum pipelines, production lines of display panels), the monitoring meters may be used to monitor each link.

SUMMARY

In an aspect, a meter monitoring system is provided. The meter monitoring system includes: a wireless gateway, a monitoring device and at least one meter recognition apparatus. The meter recognition apparatus includes an image acquirer, a processor and a wireless transceiver. The image acquirer is configured to acquire images of a display side of a monitoring meter at set time intervals. The processor is coupled to the image acquirer, and is configured to determine, based on an image processing algorithm, monitoring data displayed by the monitoring meter according to an image of the images acquired by the image acquirer. The wireless transceiver is coupled to the processor, and is configured to send the monitoring data determined by the processor to the wireless gateway. The wireless gateway is configured to transmit the received monitoring data to the monitoring device.

In some embodiments, the image acquirer includes a camera and at least two light sources each disposed on a periphery of the camera and arranged at intervals sequentially in a circumferential direction of the camera. The image acquirer is configured to take a picture with the camera in a case where only one of the at least two light sources is turned off and capture a spot-free region corresponding to the turned-off light source of the picture, until spot-free regions corresponding to the light sources are obtained; and combine all the spot-free regions to generate the image of the display side of the monitoring meter.

In some embodiments, the at least two light sources are distributed at equal intervals.

In some embodiments, the processor is further configured to: in a case where the monitoring meter is a pointer monitoring meter, determine position information of a pointer of the pointer monitoring meter according to the image; determine a scale value corresponding to the determined position information of the pointer according to the position information of the pointer and a corresponding relationship between position information of the pointer and scale values of a dial of the pointer monitoring meter; and use the determined scale value as the monitoring data corresponding to the image.

In some embodiments, the processor is further configured to: input the image to a trained neural network model; and use the neural network model to calculate the monitoring data corresponding to the image. The neural network model is obtained by training based on historical image data.

In some embodiments, the processor is further configured to obtain at least one of identity information of the monitoring meter, address information of the meter recognition apparatus, or an acquisition moment corresponding to the monitoring data. The wireless transceiver is further configured to send the at least one of the identity information of the monitoring meter, the address information of the meter recognition apparatus, or the acquisition moment corresponding to the monitoring data to the wireless gateway together with the monitoring data. The wireless gateway is further configured to transmit the at least one of the identity information of the monitoring meter, the address information of the meter recognition apparatus, or the acquisition moment corresponding to the monitoring data to the monitoring device together with the monitoring data.

In some embodiments, the processor is further configured to: determine whether a set time interval of the set time intervals is greater than or equal to a preset time interval, and establish at least one communication connection with the wireless gateway through the wireless transceiver between two adjacent acquisition moments if the set time interval is greater than or equal to the preset time interval.

In some embodiments, the processor is further configured to: determine whether a set time interval of the set time intervals is greater than or equal to a preset time interval, and establish a communication connection with the wireless gateway through the wireless transceiver at each hour exactly if the set time interval is greater than or equal to the preset time interval.

In some embodiments, the processor is further configured to: for any hour exactly, determine whether a duration from the hour exactly to a previous acquisition moment is greater than or equal to a preset duration; and if the duration from the hour exactly to the previous acquisition moment is greater than or equal to the preset duration, establish the communication connection with the wireless gateway through the wireless transceiver at the hour exactly.

In some embodiments, the monitoring device stores therein one or more update instruction, and the monitoring device is configured to: send at least one update instruction to the meter recognition apparatus through the wireless gateway when the monitoring device receives the monitoring data sent by the meter recognition apparatus, and/or, send at least one update instruction to the meter recognition apparatus through the wireless gateway when the meter recognition apparatus establishes a communication connection with the wireless gateway.

In some embodiments, the monitoring device is further configured to aggregate monitoring information fed back by all the meter recognition apparatuses to generate a monitoring data table. The monitoring information includes at least one of monitoring data of the meter recognition apparatus, an acquisition moment corresponding to the monitoring data, identity information of the monitoring meter, address information of the meter recognition apparatus, or a state of charge of a battery of the meter recognition apparatus.

In some embodiments, the monitoring data includes at least one of temperature, pressure, voltage, or current.

In another aspect, a meter recognition apparatus is provided. The meter recognition apparatus includes: an image acquirer configured to acquire images of a display side of a monitoring meter at set time intervals; a processor coupled to the image acquirer and configured to determine, based on an image processing algorithm, monitoring data displayed by the monitoring meter according to an image of the images acquired by the image acquirer; and a wireless transceiver coupled to the processor and configured to send the monitoring data determined by the processor to a wireless gateway, and use the wireless gateway to transmit the monitoring data to a monitoring device.

In some embodiments, the image acquirer includes a camera and at least two light sources each disposed on a periphery of the camera and arranged at intervals sequentially in a circumferential direction of the camera. The image acquirer is configured to: take a picture with the camera in a case where only one of the at least two light sources is turned off and capture a spot-free region corresponding to the turned-off light source of the picture, until spot-free regions corresponding to the light sources are obtained; and combine all the spot-free regions to generate the image on the display side of the monitoring meter.

In some embodiments, the at least two light sources are distributed at equal intervals.

In yet another aspect, a monitoring method is provided, and the monitoring method is applied to the meter monitoring system as described in any of the above embodiments. The monitoring method includes: acquiring, by the at least one meter recognition apparatus, images of the display side of the monitoring meter at set time intervals; determining, by the at least one meter recognition apparatus, and based on the image processing algorithm, the monitoring data displayed by the monitoring meter according to the image of the images; and sending, by the at least one meter recognition apparatus, the monitoring data to the wireless gateway, and transmitting, by the wireless gateway, the monitoring data to the monitoring device.

In some embodiments, the monitoring meter is a pointer monitoring meter, and the pointer monitoring meter includes a dial and a pointer that is capable of moving relative to the dial. Determining, based on the image processing algorithm, the monitoring data displayed by the monitoring meter according to the image of the images, includes: determining, position information of the pointer according to the image; determining a scale value corresponding to the determined position information of the pointer according to the position information of the pointer and a corresponding relationship between position information of the pointer and scale values of the dial; and using the determined scale value as the monitoring data corresponding to the image.

In some embodiments, determining, based on the image processing algorithm, the monitoring data displayed by the monitoring meter according to the image of the images, includes: inputting the image to a trained neural network model; and using the neural network model to calculate the monitoring data corresponding to the image. The neural network model is obtained by training based on historical image data.

In some embodiments, the monitoring method further includes: determining, by the at least one meter recognition apparatus, whether a set time interval of the set time intervals is greater than or equal to a preset time interval; and establishing, by the at least one meter recognition apparatus, at least one communication connection with the wireless gateway between two adjacent acquisition moments if the set time interval is greater than or equal to the preset time interval.

In some embodiments, the monitoring method further includes: determining, by the at least one meter recognition apparatus, whether a set time interval of the set time intervals is greater than or equal to a preset time interval; and establishing, by the at least one meter recognition apparatus, a communication connection with the wireless gateway at each hour exactly if the set time interval is greater than or equal to the preset time interval.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
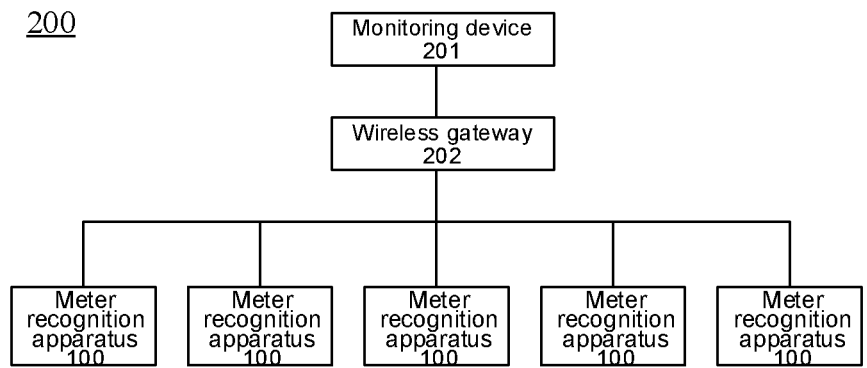
FIG. 1 is a structural diagram of a meter monitoring system, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or examples(s). In addition, the specific features, structures, materials or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, features defined by "first" and "second" may explicitly or implicitly include one or more of the features. In the description of the embodiments of the present disclosure, the term "a plurality of" or "the plurality of" means two or more unless otherwise specified.

In the description of some embodiments, terms such as "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact with each other. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The use of the phrase "applicable to" or "configured to" herein means an open and inclusive language, which does not exclude devices that are applicable to or configured to perform additional tasks or steps.

FIG. 1 shows a schematic block diagram of a meter monitoring system according to some embodiments. As shown in FIG. 1, some embodiments of the present disclosure provide a meter monitoring system 200. The meter monitoring system 200 includes at least one meter recognition apparatus 100, a monitoring device 201 and a wireless gateway 202.

In some examples, each meter recognition apparatus 100 is located on a periphery of a monitoring meter. For example, each meter recognition apparatus 100 may be disposed on a data display side of the monitoring meter 4 (e.g., a digital monitoring meter 41 shown in FIG. 2A, or a pointer monitoring meter 42 shown in FIG. 2B). It can be understood that it is not a necessary condition to arrange the meter recognition apparatus 100 on the data display side of the corresponding monitoring meter 4 here. In some possible implementations, the meter recognition apparatus 100 may be disposed on other sides of the monitoring meter 4 except for the data display side (e.g., a back side of the monitoring meter 4). In this case, an image of the display side of the monitoring meter 4 may be acquired by the meter recognition apparatus 100 through some optical lenses (e.g., reflectors).

Figure 3:
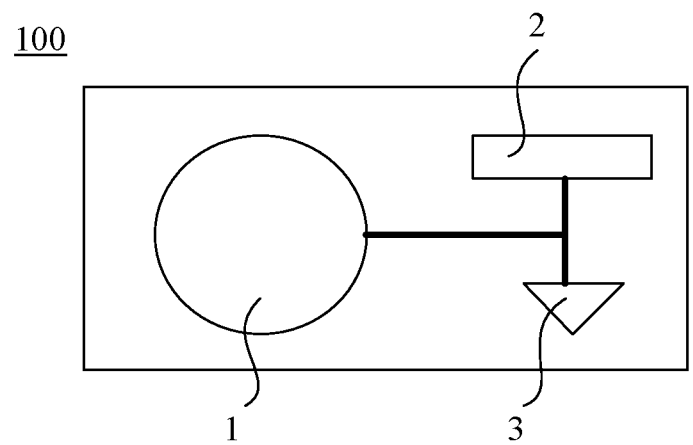
FIG. 3 is a structural diagram of a meter recognition apparatus, in accordance with some embodiments.

As shown in FIG. 3, the meter recognition apparatus 100 includes an image acquirer 1, a processor 2 coupled with the image acquirer 1, and a wireless transceiver 3 coupled with the processor 2. The image acquirer 1 may be used to acquire images of the display side of the monitoring meter. In some other possible implementations, the image acquirer 1 may be disposed only on the data display side of the monitoring meter 4, so that the image acquirer 1 acquires the images of the display side of the monitoring meter 4. Alternatively, the image acquirer 1 may be disposed on other sides of the monitoring meter 4 except the data display side, and the images of the display side of the monitoring meter 4 are acquired by the image acquirer 1 through some optical lenses. Therefore, it can be understood that, in the embodiments of the present disclosure, the specific position of the meter recognition apparatus 100 relative to the monitoring meter 4 is not limited as long as the image acquirer 1 can acquire the images of the display side of the monitoring meter 4.

The wireless transceiver 3 may be integrated with the processor 2; alternatively, the wireless transceiver 3 and the processor 2 may be separately provided. In some examples, the processor 2 is a microprocessor programmed to perform one or more operations and/or functions described herein. In some other examples, the processor 2 is executed in whole or in part by specially configured hardware (e.g., by one or more application specific integrated circuits (ASICs)).

The image acquirer 1 is configured to acquire the images of the display side of the monitoring meter 4 at set time intervals. The set time intervals may be fixed or variable. That is, a duration of an interval between the first acquisition and the second acquisition may be equal to a duration of an interval between the second acquisition and the third acquisition; alternatively, the duration of the interval between the first acquisition and the second acquisition may be not equal to the duration of the interval between the second acquisition and the third acquisition.

Figure 2A:
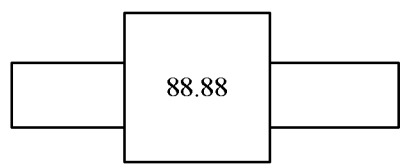
FIG. 2A is a structural diagram of a monitoring meter, in accordance with some embodiments.
Figure 2B:
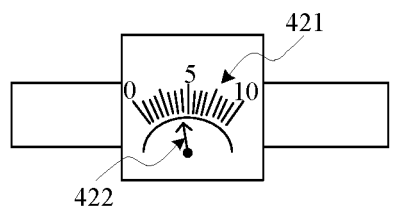
FIG. 2B is a structural diagram of another monitoring meter, in accordance with some embodiments.

Referring to FIGS. 2A and 2B, the monitoring meter 4 may be the digital monitoring meter 41 shown in FIG. 2A, or may be the pointer monitoring meter 42 shown in FIG. 2B. The image of the display side of the monitoring meter 4 refers to an image of a side where the monitoring meter 4 displays monitoring data (e.g., "88.88" in FIG. 2A). It can be understood that, for the digital monitoring meter, as shown in FIG. 2A, the monitoring data may be directly displayed in a form of numbers; and for the pointer monitoring meter, as shown in FIG. 2B, the monitoring data may be displayed through a cooperation between a dial 421 and a pointer 422 that is capable of moving relative to the dial 421.

The processor 2 is configured to determine, based on an image processing algorithm, the monitoring data of the monitoring meter according to the image acquired by the image acquirer 1. The monitoring data includes at least one of temperature, pressure, voltage, or current.

On this basis, referring to FIGS. 1 and 3, the wireless transceiver 3 is configured to send the monitoring data to the wireless gateway 202, and the wireless gateway 202 is configured to transmit the monitoring data to the monitoring device 201. Here, the monitoring device 201 may be an intelligent terminal installed with monitoring software (e.g., a mobile phone or a computer). It can be understood that the intelligent terminal includes a processor, a display screen, and the like. By running the monitoring software on the processor, the received monitoring data may be organized to generate a monitoring data table, and the display screen may display the generated the monitoring data table. In some examples, the monitoring software in the intelligent terminal may send out prompt information through the intelligent terminal in a case where a certain monitoring data is abnormal (e.g., the monitoring data exceeds a normal range).

It is worth noting that, the meter recognition apparatus 100 and the monitoring meter 4 may be well integrated together. For example, the meter recognition apparatus 100 may be used as a cover of the monitoring meter 4, which makes it possible for the meter recognition apparatus 100 and the monitoring meter 4 to play a role of protecting each other, so that the meter recognition apparatus 100 and the monitoring meter 4 are not easily affected by the external environment (e.g., affected by weather factors such as wind, rain, thunder and lightning). The meter recognition apparatus 100 and the monitoring meter 4 may be fixedly connected (e.g., welding) or may be detachably connected (e.g., rotatably connected, slidably connected), or may be non-connected (that is, the meter recognition apparatus 100 and the monitoring meter 4 may be fixed on different objects, as long as relative positions of the two may make the meter recognition apparatus 100 acquire the image of the display side of the monitoring meter 4), and the embodiments of the present disclosure do not limit the connection manner thereto.

Compared with a way of manual meter reading, the meter monitoring system 200 may greatly reduce the labor cost, improve the frequency of monitoring and the accuracy of the monitoring data. Compared with a way of robot inspection, since the meter monitoring system 200 is not easily affected by the external environment, the frequency of monitoring and the accuracy of the monitoring data may also be effectively improved, and the meter monitoring system 200 has the advantage of low cost.

In addition, since the meter recognition apparatus 100 may not only use the image acquirer 1 to achieve image acquisition, but also use the processor 2 to recognize the acquired image to determine the monitoring data, and finally, it is only necessary to send the determined monitoring data to the wireless gateway 202 through the wireless transceiver 3, and transmit the determined monitoring data to the monitoring device 201 by using the wireless gateway 202. Therefore, data to be processed (e.g., the acquired image) only needs to be transmitted from the image acquirer 1 to the processor 2, and the transmission process takes less time, which may increase the timeliness of data processing. Moreover, since it is not necessary to upload the data to be processed to the monitoring device 201 and the wireless gateway 202, a network bandwidth used for uploading may be reduced. That is, the network load may be reduced. Further, the uploading speed may be improved and the timeliness may be better. In addition, an occupation of resources of the monitoring device 201 and the wireless gateway 202 may be reduced, thereby reducing an operation burden of the monitoring device 201 and the wireless gateway 202.

In the meter recognition apparatus 100, the image acquirer 1 has various structural forms and there are various ways to acquire images by using the image acquirer 1, which will be described below through some embodiments.

Figure 4A:
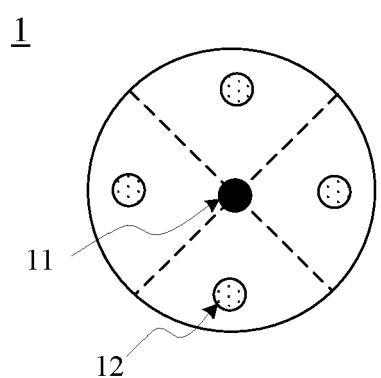
FIG. 4A is a structural diagram of an image acquirer, in accordance with some embodiments.
Figure 4B:
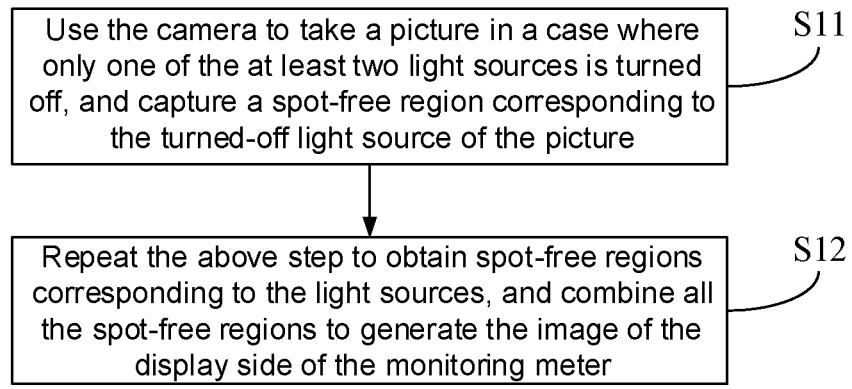
FIG. 4B is a flow diagram of an image acquisition method of an image acquirer, in accordance with some embodiments.

FIG. 4A shows a structural diagram of the image acquirer 1 according to some embodiments. FIG. 4B shows a flow diagram of an image acquisition method of the image acquirer 1 according to some embodiments.

In some embodiments, as shown in FIG. 4A, the image acquirer 1 includes a camera 11 and at least two light sources 12. The at least two light sources 12 are disposed on the periphery of the camera 11, and are arranged at intervals sequentially in a circumferential direction of the camera 11.

As shown in FIG. 4B, the image acquirer 1 is configured to perform the following steps.

In S11, the camera 11 is used to take a picture in a case where only one light source 12 of the at least two light sources 12 is turned off, and a spot-free region corresponding to the turned-off light source of the picture is captured (e.g., as shown in FIG. 4A, among four light sources 12 that are located at up, down, left and right positions, if only one light source 12 such as the light source 12 at the down position is turned off, a fan-shaped region in which the light source 12 is located may be taken as the captured spot-free region).

In S12, the above step is repeated to obtain spot-free regions (e.g., four spot-free regions may be obtained in the example of FIG. 4A) corresponding to the light sources, and all the spot-free regions are combined to generate the image of the display side of the monitoring meter. With such design, bright spot(s) are less likely to appear in the obtained image, which may avoid damage of the spot(s) to key region(s) such as the position of the pointer in the original acquired image, thereby ensuring the accuracy of obtaining the monitoring data by subsequent image processing.

For example, the at least two light sources 12 are distributed at equal intervals. For example, in FIG. 4A, the four light sources 12 are distributed at equal intervals. Of course, the number of the light sources in the embodiments of the present disclosure is not limited to four. In practical applications, for monitoring meters of different sizes, different numbers of light sources 12 may be arranged to meet the lighting requirement, so that clear images may be acquired.

For the meter recognition apparatus 100, there are various manners to determine, based on the image processing algorithm, the monitoring data of the monitoring meter 4 by the processor 2 according to the image acquired by the image acquirer 1, which will be described below through some embodiments.

In some embodiments, referring to FIG. 2B, the monitoring meter 4 is the pointer monitoring meter 42, and the pointer monitoring meter 42 includes the dial 421 and the pointer 422 that is capable of moving relative to the dial 421.

Figure 5A:
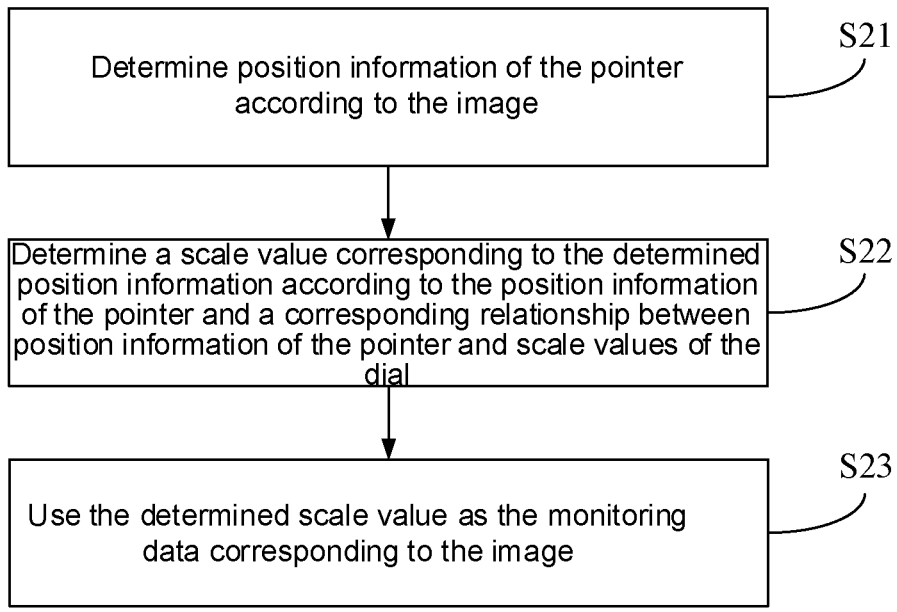
FIG. 5A is a flow diagram of a method for determining monitoring data, in accordance with some embodiments.

As shown in FIG. 5A, determining, based on the image processing algorithm, the monitoring data displayed by the monitoring meter according to the image acquired by the image acquirer, includes following steps.

In S21, position information of the pointer 422 is determined according to the image. For example, binarization processing may be performed to the image, and then the position information of the pointer is determined based on the binarized image, which is beneficial to improving the accuracy of the determined position information of the pointer.

In S22, a scale value corresponding to the determined position information of the pointer 422 is determined according to the position information of the pointer 422 and a corresponding relationship between position information of the pointer 422 and scale values of the dial 421.

In S23, the determined scale value is used as the monitoring data corresponding to the image.

The corresponding relationship between the position information of the pointer 422 and the scale values of the dial 421 may be stored in the meter recognition apparatus 100 in advance.

Alternatively, the corresponding relationship between the position information of the pointer 422 and the scale values of the dial 421 may be determined by the processor 2 according to the acquired image. For example, referring to FIG. 2B, the processor 2 may determine, according to the acquired image, a start scale value of the dial 421 (e.g., "0" in FIG. 2B) and a start position of the pointer 422, and an end scale value of the dial 421 (e.g., "10" in FIG. 2B) and an end position of the pointer 422. The start position of the pointer 422 corresponds to the start scale value of the dial 421, and the end position of the pointer 422 corresponds to the end scale value of the dial 421. Since a distance between any two adjacent scale values in the dial 421 is the same, a region from the start position of the pointer 422 to the end position of the pointer 422 is evenly distributed according to the total number of the scale values, so that the position of the pointer 422 corresponding to each scale value may be determined.

In some possible implementations, as shown in FIG. 2B, the pointer 422 may rotate around a fixed point. In this case, the position information of the pointer 422 may refer to a degree of an included angle between the current position of the pointer 422 and the start position of the pointer.

In some other possible implementations, the pointer may slide as a whole in a direction. In this case, the position information of the pointer 422 may refer to a distance between the current position of the pointer 422 and the start position of the pointer.

Figure 5B:
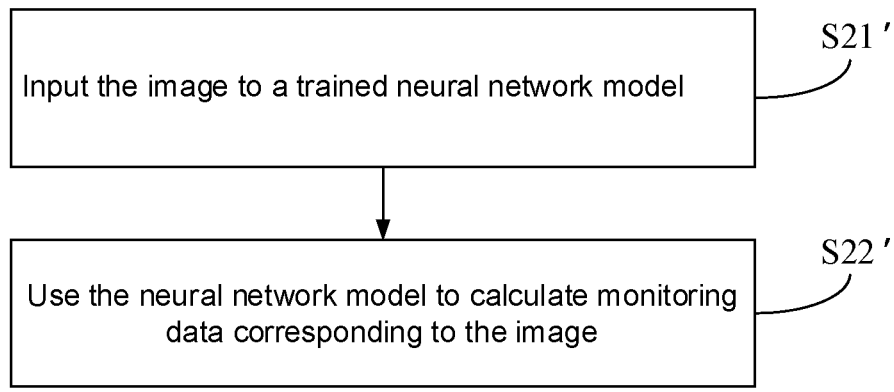
FIG. 5B is a flow diagram of another method for determining monitoring data, in accordance with some embodiments.

In some other embodiments, as shown in FIG. 5B, determining, based on the image processing algorithm, the monitoring data displayed by the monitoring meter according to the image acquired by the image acquirer, includes following steps.

In S21', the image is input to a trained neural network model.

In S22', the neural network model is used to calculate monitoring data corresponding to the image.

The neural network model is obtained by training based on historical image data. Here, the neural network model refers to an algorithm structure using a certain algorithms (e.g., a machine learning algorithm) to perform calculations.

For example, training the neural network model mainly includes the following steps: selecting a network topology; using a set of training data representing problems of network modeling; and adjusting weights until the network model represents to have the minimal error for all instances of the training data set. For example, during the supervised learning training process for neural networks, an output produced by the network in response to an input representing an instance in the training data set is compared with a marked output that is 'correct' of the instance; an error signal indicating a difference between the output and the marked output is calculated; when the error signal propagates back through layers of the network, weights associated with the connections are adjusted to minimize the error. In a case where the error of each output generated from the instances of the training data set is minimized, the neural network model is considered "trained" and may be used for inference tasks of artificial intelligence.

Multiple iterations and calculations are performed on a large amount of training samples (i.e., historical image data), specific features of these training samples are extracted, and ultimately algorithm structures and parameter values that converge on the data set with the specific features can be obtained. That is, the neural network model capable of recognizing data with specific features is obtained, so that monitoring data corresponding to the image may be output by using the neural network model.

The neural network model may include but be not limited to: a feedforward neural network model, a convolutional neural network (CNN) model, a recurrent neural network (RNN) model, and a generative adversarial network (GAN) model, and other neural network models known by those skilled in the art may also be used.

Figure 6:
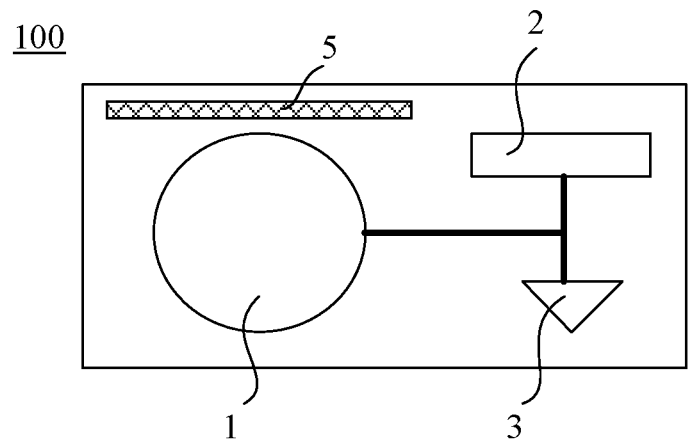
FIG. 6 is a structural diagram of another meter recognition apparatus, in accordance with some embodiments.
Figure 7:
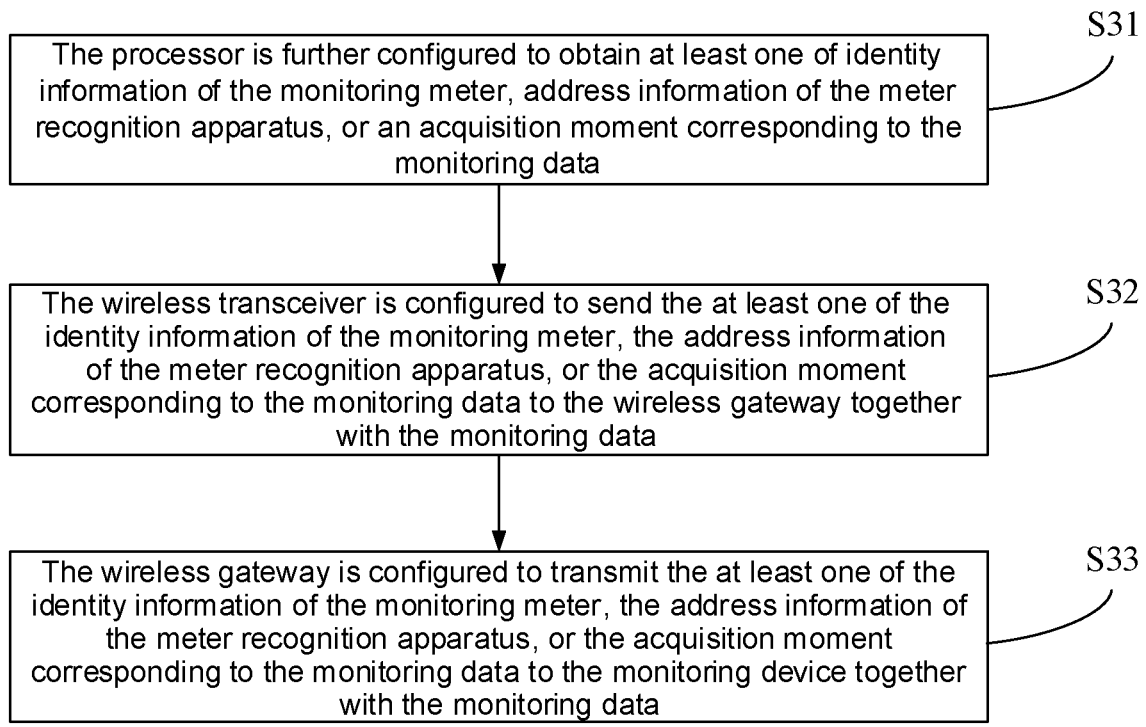
FIG. 7 is a flow diagram of a monitoring method of a meter monitoring system, in accordance with some embodiments.

In some embodiments of the present disclosure, as shown in FIG. 6, the meter recognition apparatus 100 further includes a battery 5. The battery 5 may supply power to components (e.g., the image acquirer 1, the processor 2 and the wireless transceiver 3) in the meter recognition apparatus 100. With such arrangement, there is no need to lead power harnesses to the outside of the meter recognition apparatus 100, so that the meter recognition apparatus 100 may be applied to a variety of complex scenes (e.g., a location where the mains electricity is not supplied).

It will be noted that the embodiments of the present disclosure do not limit the type of the battery 5. For example, the battery 5 may be a common rechargeable battery, a solar rechargeable battery, or a disposable battery.

In a case where the meter recognition apparatus 100 includes the battery 5, for example, the processor 2 is further configured to obtain a state of charge of the battery 5, and send the state of charge of the battery 5 together with the monitoring data to the wireless gateway through the wireless transceiver 3, so as to transmit the state of charge of the battery 5 together with the monitoring data to the monitoring device 201 by using the wireless gateway 202.

With such arrangement, the state of charge of the battery 5 may be monitored, so that the battery 5 may be replaced or charged in time before the state of charge of the battery 5 is used up, thereby preventing the meter recognition apparatus 100 from stopping operation due to the dead battery 5.

In some embodiments of the present disclosure, referring to FIGS. 1, 2A, 2B, 3 and 7, the meter monitoring system 200 further includes the following functions.

In S31, the processor 2 is further configured to obtain at least one of identity information of the monitoring meter 4, address information of the meter recognition apparatus 100, and an acquisition moment corresponding to the monitoring data.

It will be noted that, for acquiring the image of the display side of the monitoring meter 4 once, if only one picture is taken by the camera 11, the acquisition moment corresponding to the monitoring data may be a moment of taking the picture; and if multiple pictures are taken by the camera 11, the acquisition moment corresponding to the monitoring data may be an intermediate moment in the multiple moments of taking the multiple pictures, or a last moment in the multiple moments of taking the multiple pictures.

The address information of the meter recognition apparatus 100 may be an Internet Protocol Address (IP address).

The identity information of the monitoring meter 4 may be a station number. For example, in a case where M monitoring meters 4 are arranged in a plant, the M monitoring meters 4 may be sequentially numbered from 1 to M, and M is a positive integer greater than or equal to two. Here, the monitoring meters 4 may be numbered in a form of hardware; alternatively, the monitoring meters 4 may be numbered in a form of software.

In S32, the wireless transceiver 3 is configured to send the at least one of the identity information of the monitoring meter 4, the address information of the meter recognition apparatus 100, and the acquisition moment corresponding to the monitoring data to the wireless gateway 202 together with the monitoring data.

In S33, the wireless gateway 202 transmits the at least one of the identity information of the monitoring meter 4, the address information of the meter recognition apparatus 100, and the acquisition moment corresponding to the monitoring data to the monitoring device 201 together with the monitoring data.

With such arrangement, the monitoring device 201 may classify and aggregate the corresponding monitoring data according to the at least one of the identity information of the monitoring meter 4, the address information of the meter recognition apparatus 100, and the acquisition moment corresponding to the monitoring data.

Here, it will be noted that, in a case where the monitoring device 201 stores update instruction(s) therein, the processor 2 may further be configured to receive, through the wireless transceiver 3, the update instruction(s) sent by the monitoring device 201 through the wireless gateway 202 while sending the monitoring data to the wireless gateway 202. In this way, the meter recognition apparatus 100 may receive the update instruction(s) while uploading data. The update instruction(s) may include an update instruction of a parameter of the image acquirer 1, and the parameter may be, for example, the parameter of the camera and the brightness of the light source.

Figure 8:
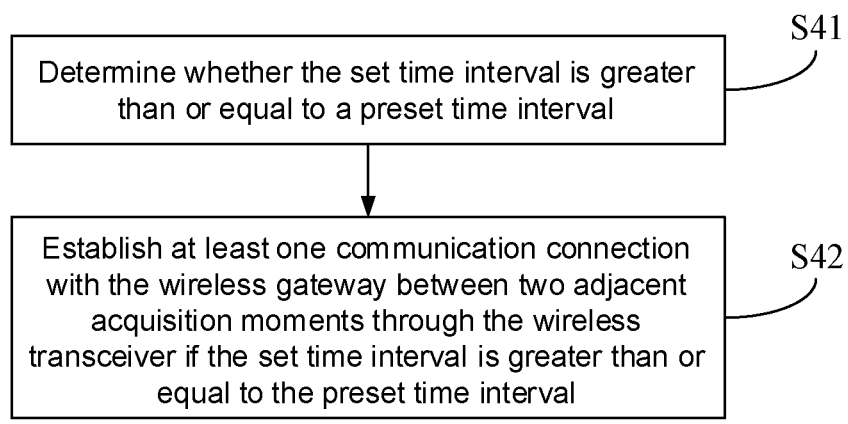
FIG. 8 is a flow diagram of another monitoring method of a meter monitoring system, in accordance with some embodiments.

In some embodiments, as shown in FIG. 8, the processor 2 is further configured to perform the following steps.

In S41, it is determined whether the set time interval is greater than or equal to a preset time interval. The preset time interval may be one hour. Alternatively, the preset time interval may be another time interval, such as 100 minutes, 120 minutes, and the like.

In S42, at least one communication connection with the wireless gateway 202 is established between two adjacent acquisition moments through the wireless transceiver 3 if the set time interval is greater than or equal to the preset time interval.

With such design, in a case where the time interval between two adjacent acquisition moments is too long, it is possible to determine whether the wireless transceiver 3 may communicate with the wireless gateway 202 normally, so that a situation where the meter recognition apparatus 100 malfunctions for a long time and the malfunction is not detected is not easy to occur, thereby improving the security throughout the whole monitoring duration.

On this basis, for example, a duration between two adjacent acquisition moments may be evenly divided through the at least one communication connection. For example, in a case where the duration between two adjacent acquisition moments is 90 minutes and two communication connections are established between two adjacent acquisition moments, a communication connection may be established every 30 minutes, so as to achieve a good effect of troubleshooting.

Figure 9:
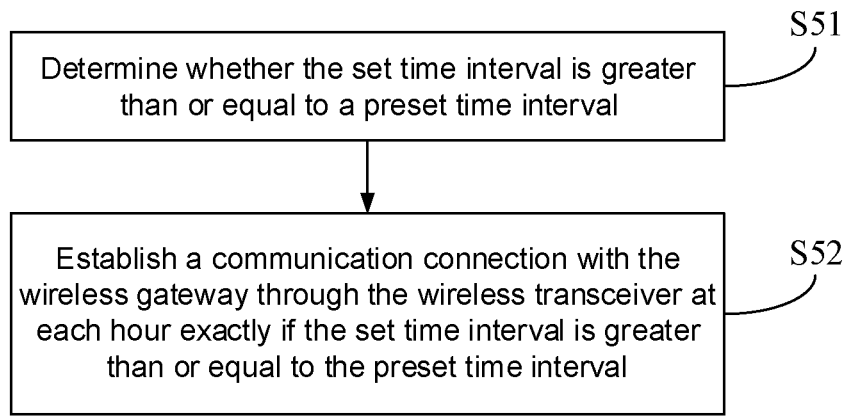
FIG. 9 is a flow diagram of yet another monitoring method of a meter monitoring system, in accordance with some embodiments.

In some other embodiments, as shown in FIG. 9, the processor 2 is further configured to perform the following steps.

In S51, it is determined whether the set time interval is greater than or equal to a preset time interval. Similarly, the preset time interval may be one hour. Alternatively, the preset time interval may be another time interval, such as 100 minutes, 120 minutes, and the like.

In S52, a communication connection with the wireless gateway is established through the wireless transceiver at each hour exactly if the set time interval is greater than or equal to the preset time interval.

With such design, in a case where the time interval between two adjacent acquisition moments is too long, it is possible to determine whether the wireless transceiver 3 may communicate with the wireless gateway 202 normally, so that a situation where the meter recognition apparatus 100 malfunctions for a long time and the malfunction is not detected is not easy to occur, thereby improving the security throughout the whole monitoring duration.

It is worth noting that, in the some other embodiments, when it is determined that the set time interval is greater than or equal to the preset time interval (that is, the duration between two adjacent acquisition moments is too long, for example, greater than or equal to one hour), the communication connection is directly established at each hour exactly, and there is no need to calculate time for establishing the communication connection. Therefore, the complexity of the logic design may be reduced, and the stability of communication and timeliness of finding the malfunction may be ensured.

On this basis, for example, the processor 2 may further be configured to: for any hour exactly, determine whether a duration from the hour exactly to the previous acquisition moment is greater than or equal to a preset duration (for example, the preset duration may be in a range of five minutes to fifteen minutes); if so, establish the communication connection with the wireless gateway through the wireless transceiver at the hour exactly; if not, not establish the communication connection with the wireless gateway through the wireless transceiver at the hour exactly.

With such design, the meter recognition apparatus 100 will not establish the communication connection with the wireless gateway 202 for a period of time after sending the monitoring data to the wireless gateway 202, so that a situation where the recognition apparatus 100 communicates frequently with the wireless gateway 202 is not easy to occur.

During the period when the meter recognition apparatus 100 establishes the communication connection with the wireless gateway 202 through the wireless transceiver 3, for example, the meter recognition apparatus 100 may also receive, through the wireless transceiver 3, the update instruction(s) sent by the monitoring device 201 through the wireless gateway 202. The update instruction(s) may further include, for example, an update instruction of the set time interval, an update instruction of the preset time interval and an update instruction of the preset duration.

The meter recognition apparatus 100 does not receive the update instruction when being in a sleep state (that is, a state in which the meter recognition apparatus 100 does not upload the monitoring data and does not establish the communication connection). In this case, the update instruction may be stored in the monitoring device 201 in advance, and by the time the meter recognition apparatus 100 sends the monitoring data to the wireless gateway 202 or the meter recognition apparatus 100 establishes the communication connection with the wireless gateway 202, the monitoring device 201 transmits the update instruction to the wireless gateway 202, and uses the wireless gateway 202 to send the update instruction to a corresponding meter recognition apparatus 100, so as to achieve a low-power consumption operation.

Based on this, in a case where the monitoring device 201 stores therein the update instruction(s), for example, the monitoring device 201 is configured to: send at least one update instruction to the meter recognition apparatus 100 through the wireless gateway 202 when receiving the monitoring data sent by the meter recognition apparatus 100, and/or, send at least one update instruction to the meter recognition apparatus 100 through the wireless gateway 202 when the monitoring device 201 establishes the communication connection with the wireless gateway 202. The update instruction(s) may include the update instruction of the parameter of the image acquirer 1 (e.g., the parameter of the camera and the brightness of the light source), the update instruction of the set time interval, the update instruction of the preset time interval and the update instruction of the preset duration.

With such arrangement, the meter recognition apparatus 100 may not receive the update instruction when being in the sleep state (that is, the state in which the meter recognition apparatus 100 does not upload the monitoring data and does not establish the communication connection). In this case, the update instruction may be stored in the monitoring device 201 in advance, and by the time the meter recognition apparatus 100 sends the monitoring data to the wireless gateway 202 or the meter recognition apparatus 100 establishes the communication connection with the wireless gateway 202, the monitoring device 201 transmits the update instruction to the wireless gateway 202, and uses the wireless gateway 202 to send the update instruction to the corresponding meter recognition apparatus 100, so as to achieve the low-power consumption operation.

In some embodiments, the monitoring device 201 is further configured to aggregate monitoring information fed back by all the meter recognition apparatuses 100 to generate a monitoring data table. The monitoring information include at least one of the monitoring data of the meter recognition apparatus 100, the acquisition moment corresponding to the monitoring data, the identity information of the monitoring meter 4, the address information of the meter recognition apparatus 100, or the state of charge of the battery of the meter recognition apparatus 100.

With such design, monitoring information corresponding to all the monitoring meters may be presented intuitively, so as to achieve a purpose of checking the monitoring data of all the monitoring meters conveniently. In addition, it is worth noting that, the monitoring device 201 is configured to directly receive the monitoring information and aggregate the received monitoring information to generate the monitoring data table, and it is not necessary for the monitoring device 201 to process the data to be processed (e.g., the image of the display side of the monitoring meter) acquired by the meter recognition apparatus 100 to generate the monitoring data. Therefore, the occupation of resources of the monitoring device 201 and the wireless gateway 202 may be reduced, thereby reducing an operation burden of the monitoring device 201 and the wireless gateway 202.

Based on the above technical solutions of the meter monitoring system 200, as shown in FIG. 3, some embodiments of the present disclosure provide a meter recognition apparatus 100, and the meter recognition apparatus 100 may be the meter recognition apparatus 100 as described in any of the above embodiments. Therefore, the meter recognition apparatus 100 has all the beneficial effects as described above.

Figure 10:
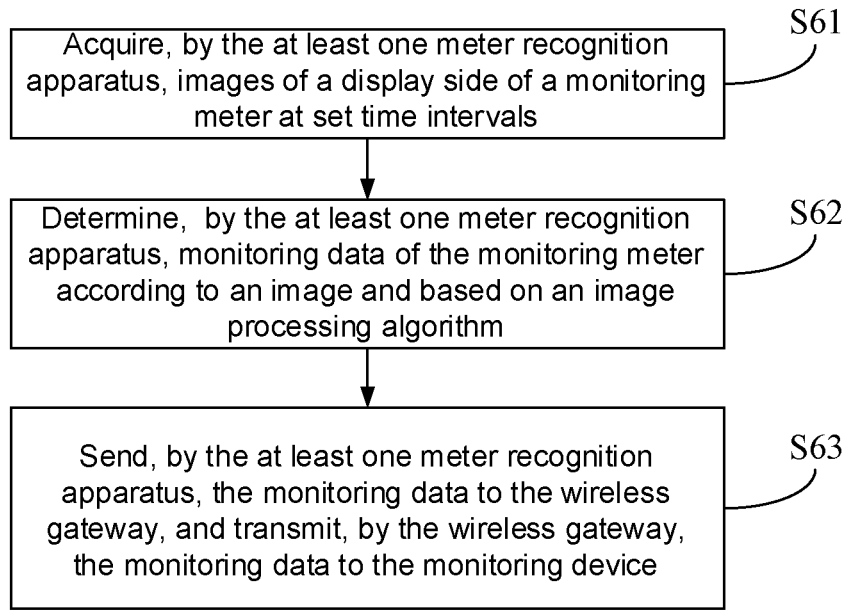
FIG. 10 is a flow diagram of yet another monitoring method of a meter monitoring system, in accordance with some embodiments.

FIG. 10 shows a flow diagram of a monitoring method according to some embodiments. As shown in FIG. 10, some embodiments of the present disclosure provide the monitoring method, and the monitoring method may be applied to the meter monitoring system as described in any of the above embodiments.

Referring to FIGS. 3 and 10, the monitoring method includes the following steps.

In S61, the at least one meter recognition apparatus 100 acquires images of a display side of a monitoring meter at set time intervals.

In S62, the at least one meter recognition apparatus 100 determines monitoring data of the monitoring meter according to an image.

In S63, the at least one meter recognition apparatus 100 sends the monitoring data to the wireless gateway 202, and transmits the monitoring data to the monitoring device 201 by using the wireless gateway 202.

Compared with the way of manual meter reading, the monitoring method may greatly reduce the labor cost, improve the frequency of monitoring and the accuracy of the monitoring data. Compared with the way of robot inspection, since monitoring method is not easily affected by the external environment, the frequency of monitoring and the accuracy of the monitoring data may also be effectively improved, and the meter monitoring system 200 has the advantage of low cost.

In addition, since the monitoring method may not only use the meter recognition apparatus 100 to achieve image acquisition, but also use the meter recognition apparatus 100 to recognize the acquired image to determine the monitoring data, and finally, it is only necessary to send the determined monitoring data to the wireless gateway 202, and transmit the determined monitoring data to the monitoring device 201 by using the wireless gateway 202. Therefore, the data to be processed (e.g., the acquired image) only needs to be transmitted and processed between internal components (e.g., the image acquirer and the processor), and the transmission process takes less time, which may increase the timeliness of data processing. Moreover, since it is not necessary to upload the data to be processed to the monitoring device 201 and the wireless gateway 202, the network bandwidth used for uploading may be reduced. That is, the network load may be reduced. Further, the uploading speed may be improved and the timeliness may be better. In addition, the occupation of resources of the monitoring device 201 and the wireless gateway 202 may be reduced, thereby reducing the operation burden of the monitoring device 201 and the wireless gateway 202.

Figure 11:
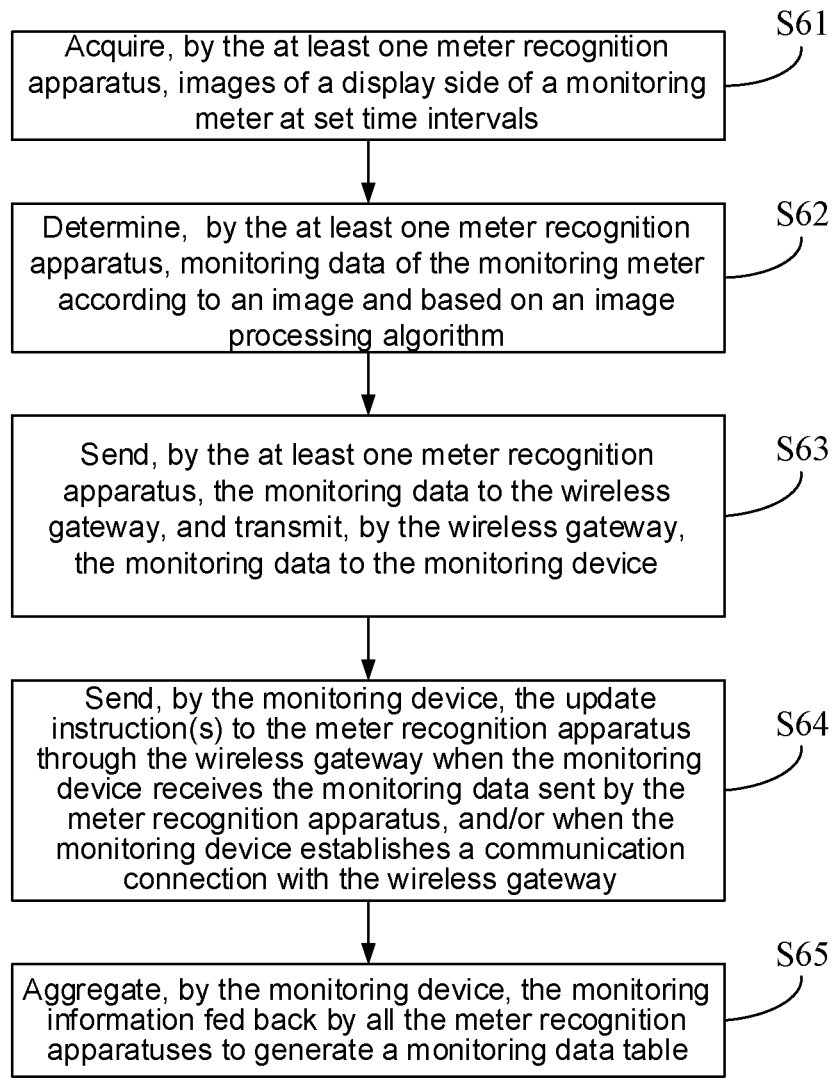
FIG. 11 is a flow diagram of yet another monitoring method of a meter monitoring system, in accordance with some embodiments.

In a case where the monitoring device 201 stores the update instruction(s) therein, for example, as shown in FIG. 11, the monitoring method further includes the following step.

In S64, the monitoring device 201 sends the update instruction(s) to the meter recognition apparatus 100 through the wireless gateway 202 when the monitoring device 201 receives the monitoring data sent by the meter recognition apparatus 100; and/or, the monitoring device 201 sends the update instruction(s) to the meter recognition apparatus 100 through the wireless gateway 202 when the monitoring device 201 establishes a communication connection with the wireless gateway 202.

With such arrangement, the meter recognition apparatus 100 may not receive the update instruction when being in the sleep state (that is, the state in which the meter recognition apparatus 100 does not upload the monitoring data and does not establish the communication connection). In this case, the update instruction may be stored in the monitoring device 201 in advance, and by the time the meter recognition apparatus 100 sends the monitoring data to the wireless gateway 202 or the meter recognition apparatus 100 establishes the communication connection with the wireless gateway 202, the monitoring device 201 transmits the update instruction to the wireless gateway 202, and uses the wireless gateway 202 to send the update instruction to a corresponding meter recognition apparatus 100, so as to achieve the low-power consumption operation.

In some embodiments, as shown in FIG. 11, the monitoring method further includes the following step.

In S65, the monitoring device 201 aggregates the monitoring information fed back by all the meter recognition apparatuses 100 to generate a monitoring data table. The monitoring information include at least one of the monitoring data of the meter recognition apparatus 100, the acquisition moment corresponding to the monitoring data, the identity information of the monitoring meter 4, the address information of the meter recognition apparatus 100, or the state of charge of the battery of the meter recognition apparatus 100.

In this way, the monitoring information corresponding to all the monitoring meters may be presented intuitively, so as to achieve the purpose of checking the monitoring data of all the monitoring meters conveniently. In addition, it is worth noting that, the monitoring device 201 is configured to directly receive the monitoring information and aggregate the received monitoring information to generate the monitoring data table, and it is not necessary for the monitoring device 201 to process the data to be processed (e.g., the image of the display side of the monitoring meter) acquired by the meter recognition apparatus 100 to generate the monitoring data. Therefore, the occupation of resources of the monitoring device 201 and the wireless gateway 202 may be reduced, thereby reducing an operation burden of the monitoring device 201 and the wireless gateway 202.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the scope of the present disclosure shall be subject to the protection scope of the claims.

What is claimed is:

1. A meter monitoring system, comprising:
    at least one meter recognition apparatus, the meter recognition apparatus including:
        an image acquirer, the image acquirer being configured to acquire images of a display side of a monitoring meter at set time intervals;
        a processor coupled to the image acquirer, the processor being configured to determine, based on an image processing algorithm, monitoring data displayed by the monitoring meter according to an image of the images acquired by the image acquirer;
        a wireless transceiver coupled to the processor, the wireless transceiver being configured to send the monitoring data determined by the processor to a wireless gateway;
    a monitoring device; and
    the wireless gateway, the wireless gateway being configured to transmit the received monitoring data to the monitoring device;
    wherein the image acquirer includes:
        a camera; and
        at least two light sources each disposed on a periphery of the camera and arranged at intervals sequentially in a circumferential direction of the camera; and
    the image acquirer is configured to:
        take a picture with the camera in a case where only one of the at least two light sources is turned off and capture a spot-free region corresponding to the turned-off light source of the picture, until spot-free regions corresponding to the light sources are obtained, wherein each turned-off light source corresponds to a different spot-free region; and
        combine all the spot-free regions to generate the image of the display side of the monitoring meter.

2. The meter monitoring system according to claim 1, wherein the at least two light sources are distributed at equal intervals.

3. The meter monitoring system according to claim 1, wherein
    the processor is further configured to:
    in a case where the monitoring meter is a pointer monitoring meter, determine position information of a pointer of the pointer monitoring meter according to the image;
    determine a scale value corresponding to the determined position information of the pointer according to the position information of the pointer and a corresponding relationship between position information of the pointer and scale values of a dial of the pointer monitoring meter; and
    use the determined scale value as the monitoring data corresponding to the image.

4. The meter monitoring system according to claim 1, wherein the processor is further configured to:
    input the image to a trained neural network model; and
    use the neural network model to calculate the monitoring data corresponding to the image, wherein
    the neural network model is obtained by training based on historical image data.

5. The meter monitoring system according to claim 1, wherein
    the processor is further configured to obtain at least one of identity information of the monitoring meter, address information of the meter recognition apparatus, or an acquisition moment corresponding to the monitoring data;
    the wireless transceiver is further configured to send the at least one of the identity information of the monitoring meter, the address information of the meter recognition apparatus, or the acquisition moment corresponding to the monitoring data to the wireless gateway together with the monitoring data; and
    the wireless gateway is further configured to transmit the at least one of the identity information of the monitoring meter, the address information of the meter recognition apparatus, or the acquisition moment corresponding to the monitoring data to the monitoring device together with the monitoring data.

6. The meter monitoring system according to claim 1, wherein the processor is further configured to:
- determine whether a set time interval of the set time intervals is greater than or equal to a preset time interval; and
- establish at least one communication connection with the wireless gateway through the wireless transceiver between two adjacent acquisition moments if the set time interval is greater than or equal to the preset time interval.

7. The meter monitoring system according to claim 1, wherein the processor is further configured to:
- determine whether a set time interval of the set time intervals is greater than or equal to a preset time interval; and
- establish a communication connection with the wireless gateway through the wireless transceiver at each hour exactly if the set time interval is greater than or equal to the preset time interval.

8. The meter monitoring system according to claim 7, wherein the processor is further configured to:
- for any hour exactly, determine whether a duration from the hour exactly to a previous acquisition moment is greater than or equal to a preset duration; and
- if the duration from the hour exactly to the previous acquisition moment is greater than or equal to the preset duration, establish the communication connection with the wireless gateway through the wireless transceiver at the hour exactly.

9. The meter monitoring system according to claim 1, wherein the monitoring device stores therein one or more update instructions, and the monitoring device is configured to:
- send at least one update instruction to the meter recognition apparatus through the wireless gateway when the monitoring device receives the monitoring data sent by the meter recognition apparatus, and/or
- send at least one update instruction to the meter recognition apparatus through the wireless gateway when the meter recognition apparatus establishes a communication connection with the wireless gateway.

10. The meter monitoring system according to claim 1, wherein the monitoring device is further configured to aggregate monitoring information fed back by all the meter recognition apparatuses to generate a monitoring data table, wherein
- the monitoring information includes at least one of monitoring data of the meter recognition apparatus, an acquisition moment corresponding to the monitoring data, identity information of the monitoring meter, address information of the meter recognition apparatus, or a state of charge of a battery of the meter recognition apparatus.

11. The meter monitoring system according to claim 1, wherein the monitoring data includes at least one of temperature, pressure, voltage, or current.

12. A monitoring method applied to the meter monitoring system according to claim 1, the monitoring method comprising:
- acquiring, by the at least one meter recognition apparatus, the images of the display side of the monitoring meter at set time intervals;
- determining, by the at least one meter recognition apparatus, and based on the image processing algorithm, the monitoring data displayed by the monitoring meter according to the image of the images; and
- sending, by the at least one meter recognition apparatus, the monitoring data to the wireless gateway, and
- transmitting, by the wireless gateway, the monitoring data to the monitoring device;
- wherein acquiring, by the at least one meter recognition apparatus, the images of the display side of the monitoring meter at set time intervals, includes:
  - taking, by the image acquirer, the picture with the camera in a case where only one of the at least two light sources is turned off, and capturing, by the image acquirer, the spot-free region corresponding to the turned-off light source of the picture, until the spot-free regions corresponding to the light sources are obtained, wherein each turned-off light source corresponds to the different spot-free region; and
  - combining, by the image acquirer, the all the spot-free regions to generate the image of the display side of the monitoring meter.

13. The monitoring method according to claim 12, wherein the monitoring meter is a pointer monitoring meter, and the pointer monitoring meter includes a dial and a pointer that is capable of moving relative to the dial;
- determining, based on the image processing algorithm, the monitoring data displayed by the monitoring meter according to the image of the images, includes:
- determining, position information of the pointer according to the image;
- determining a scale value corresponding to the determined position information of the pointer according to the position information of the pointer and a corresponding relationship between position information of the pointer and scale values of the dial; and
- using the determined scale value as the monitoring data corresponding to the image.

14. The monitoring method according to claim 12, wherein determining, based on the image processing algorithm, the monitoring data displayed by the monitoring meter according to the image of the images, includes:
- inputting the image to a trained neural network model; and
- using the neural network model to calculate the monitoring data corresponding to the image, wherein
- the neural network model is obtained by training based on historical image data.

15. The monitoring method according to claim 12, further comprising:
- determining, by the at least one meter recognition apparatus, whether a set time interval of the set time intervals is greater than or equal to a preset time interval; and
- establishing, by the at least one meter recognition apparatus, at least one communication connection with the wireless gateway between two adjacent acquisition moments if the set time interval is greater than or equal to the preset time interval.

16. The monitoring method according to claim 12, further comprising:
- determining, by the at least one meter recognition apparatus, whether a set time interval of the set time intervals is greater than or equal to a preset time interval; and
- establishing, by the at least one meter recognition apparatus, a communication connection with the wireless gateway at each hour exactly if the set time interval is greater than or equal to the preset time interval.

17. A meter recognition apparatus, comprising:
an image acquirer, the image acquirer being configured to acquire images of a display side of a monitoring meter at set time intervals;
a processor coupled to the image acquirer, the processor being configured to determine, based on an image processing algorithm, monitoring data displayed by the monitoring meter according to an image of the images acquired by the image acquirer; and
a wireless transceiver coupled to the processor, the wireless transceiver being configured to send the monitoring data determined by the processor to a wireless gateway, and use the wireless gateway to transmit the monitoring data to a monitoring device;
wherein the image acquirer includes:
a camera; and
at least two light sources each disposed on a periphery of the camera and arranged at intervals sequentially in a circumferential direction of the camera; and
the image acquirer is configured to:
take a picture with the camera in a case where only one of the at least two light sources is turned off and capture a spot-free region corresponding to the turned-off light source of the picture, until spot-free regions corresponding to the light sources are obtained, wherein each turned-off light source corresponds to a different spot-free region; and
combine all the spot-free regions to generate the image of the display side of the monitoring meter.

18. The meter recognition apparatus according to claim 17, wherein the at least two light sources are distributed at equal intervals.

* * * * *